United States Patent [19]
Ouchi et al.

[11] 3,917,683

[45] Nov. 4, 1975

[54] PROCESS FOR THE PREPARATION OF DL-METHIONINE

[75] Inventors: Shunji Ouchi; Chisei Shibuya, both of Tokyo, Japan

[73] Assignee: Deutsche Gold-und Silber-Scheideanstalt Vormals Roessler, Frankfurt, Germany

[22] Filed: May 10, 1971

[21] Appl. No.: 141,567

[30] Foreign Application Priority Data

May 8, 1970 Japan.............................. 45-38629

[52] U.S. Cl. ............................................ 260/534 S
[51] Int. Cl.² .................................... C07C 149/247
[58] Field of Search............. 260/534 S, 534 R, 534

[56] References Cited
UNITED STATES PATENTS 2,485,236  10/1949  Gresham et al. ................ 260/534 S

FOREIGN PATENTS OR APPLICATIONS 962,072   5/1950   France............................ 260/534 S

*Primary Examiner*—John F. Terapane
*Attorney, Agent, or Firm*—Burgess, Dinklage & Sprung

[57] ABSTRACT

Improved process for the preparation of DL-methionine wherein the addition reaction of methyl mercaptan to acrolein cyanohydrin and the hydantoin ring forming reaction are simultaneously effected in one-stage to give a hydantoin type intermediate, which is then hydrolyzed. The process can be simply and easily conducted to obtain high purity DL-methionine in high yield at low cost.

4 Claims, 1 Drawing Figure

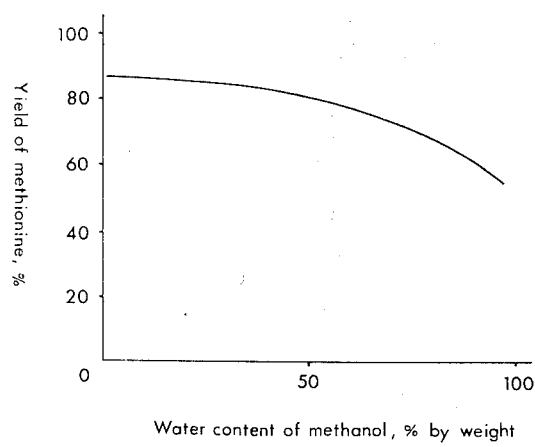

PROCESS FOR THE PREPARATION OF DL-METHIONINE

This invention relates to improvements in the preparation of DL-methionine, and more particularly to a process for the preparation of DL-methionine which comprises reacting acrolein cyanhydrin with methyl mercaptan, an ammonia or ammonium supply agent, and a carbonic acid or carbonate supplying agent in the presence of an organic or aqueous organic solvent to accomplish an addition reaction of the methyl mercaptan to a double bond of the acrolein cyanhydrin simultaneously with a hydantoin ring forming reaction followed by hydrolysis of the resulting product.

For preparing DL-methionine through a hydantoin ring forming reaction, there have conventionally and generally been known the methods which can be illustrated as follows.

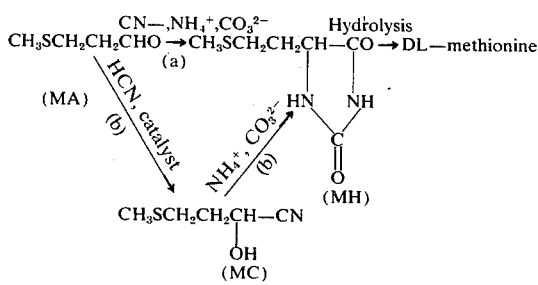

Stated in detail, U.S. Pat. Nos. 2,527,366 and 2,557,913 and British Pat. No. 630,139 disclosed the route (a) in which DL-methionine can be obtained by reacting β-methylthiopropionaldehyde (hereinafter referred to simply as "MA") with a cyanide, ammonia and carbonic acid to effect a hydantoin ring forming reaction and subsequently subjecting the resulting hydantoin derivatives, for example 5-(β-methyl-thioethyl)-hydantoin (hereinafter referred to simply as "MH") to hydrolysis. As a modified process of the route (a), British Pat. No. 653,803, Japanese Pat. application publication No. 14688/1964 and the Journal of the American Chemical Society 70, 1450 (1948) disclosed the route (b) in which DL-methionine can be prepared by subjecting MA to an addition reaction with hydrocyanic acid to give α-hydroxy-γ-methyl-mercapto-butyronitrile (hereinafter referred to simply as "MC") followed by the hydantoin ring forming reaction of the MC and subsequently by hydrolysis.

Meanwhile, with regard to a method of producing MA to be employed as a starting material in the above-mentioned conventional processes, it has been proposed in, for example, U.S. Pat. Nos. 2,485,236 and 2,527,366 and Japanese Pat. application publication No. 19090/1965 that acrolein is subjected to an addition reaction with methyl mercaptan in the presence of a catalyst.

However, the conventional methods as mentioned above, are accompanied by some drawbacks. For example, in the preparation of MA by the addition reaction of methyl mercaptan to acrolein, the excessive amount of methyl mercaptan is required and, in addition, the yield of the desired MA is not so high. The route (b) as mentioned before, is necessarily conducted in two steps, namely MC-producing step of the addition reaction of hydrocyanic acid to MA and step of hydantoin ring forming reaction of the MC, and accordingly is complicated in operation. Moreover, in the route (b), the addition reaction of hydrocyanic acid usually needs a catalyst.

Therefore, it is one object of the present invention to provide a process for the preparation of DL-methionine which is simple in operation and economical.

It is another object of the present invention to provide a process of the character described above, whereby high purity DL-methionine can be obtained in high yield.

The foregoing and other objects, features and advantages will be apparent from the following detailed description and claims.

As a result of an intensive study made by the present inventors with regard to improved process for the synthesis of DL-methionine starting from acrolein, they have successfully attained the present novel process which employs as a starting material acrolein cyanohydrin (hereinafter referred to simply as "AC") that can be easily obtained by the reaction of acrolein with hydrocyanic acid or alkali cyanide at low cost.

Stated more in detail, according to the present invention, there is provided a process for the preparation of DL-methionine which comprises reacting acrolein cyanohydrin (AC) with methyl mercaptan, an ammonia or ammonium supplying agent and a carbonic acid or carbonate supplying agent, in the presence of an organic or aqueous organic solvent to accomplish an addition reaction of the methyl mercaptan to a double bond of the acrolein cyanohydrin (AC) simultaneously with a hydantoin ring forming reaction followed by hydrolysis of the resulting product.

The process according to the present invention can be illustrated by the following reaction formula:

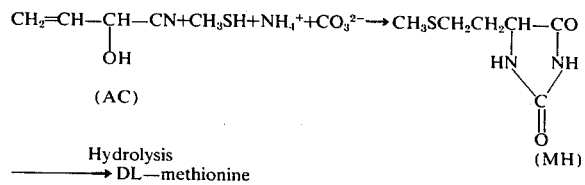

The principal feature of the present invention resides in that the addition reaction of methyl mercaptan to a double bond of AC and the hydantoin ring forming reaction are simultaneously effected in one-stage and the hydrolysis of the resulting hydantoin type intermediate gives high purity DL-methionine in high yield. In addition, the process of this invention requires no catalyst and can be easily carried out, leading to the economical production of DL-methionine.

On the other hand, one of the present inventors has previously suggested, in Japanese patent application No. 63241/1966, the synthesis of MC, intermediate of the route (b), by reacting AC with methyl mercaptan under such specific conditions as mentioned below.

The process for such synthesis of MC consists in reacting AC with methyl mercaptan in an organic solvent in the presence of 0.05 to 0.0001 equivalent of an alkaline catalyst, the reaction being effected under such condition that the water content of the reaction mixture is maintained at 1% or less. In practising such process, however, it is necessary for obtaining good result to reduce the amount of catalyst and the water content to extents as low as possible.

By contrast, according to the present invention, the reaction of AC with methyl mercaptan and the so-called hydantoin ring forming reagent can be easily carried out without need of specific limitation of the water content of the reaction mixture. Furtheremore, it is to be noted that, in the process of the present invention, the hydantoin ring forming reagent, for example ammonium carbonate can serve also as a catalyst for the addition reaction of methyl mercaptan to AC.

As stated above, the process of the present invention can advantageously be conducted without any detrimental influence by the water present in the reaction mixture. The illustrative explanation will be made with reference to the accompanying drawing in which figure is a diagram showing the relationship between the water content of a solvent of methanol and the yield of methionine. As apparent from FIGURE, the yield of methionine is scarcely lowered even when the water content of methanol is 50% by weight, based on the total weight of aqueous methanol solvent. It is understood from this fact that the process of the present invention is different in type of reaction from the process for the synthesis of MC as disclosed in the above-mentioned Japanese patent application No. 63241/1966.

Generally, AC to be employed as a starting material in the process of this invention is unstable under the alkaline condition. In fact, when a base is present in the system, AC is subject to side reactions such as decomposition and polymerization, as a result of which most of it is converted to resinous substances. In the process of the present invention, AC is reacted with methyl mercaptan and a hydantoin ring forming reagent. The hydantoin ring forming reagent is a basic material which would have a detrimental influence on AC to lower the stability thereof. However, due to co-existence of methyl mercaptan, the desired reaction of this invention can smoothly proceed without any formation of resinous substances, even though the reaction system is basic. For proving the specific effect of the present invention, the comparative experiment was conducted as follows: AC was reacted with ammonium carbonate in the absence of methyl mercaptan and, as a result, there was obtained a resinous substance of unknown structure against the common expectation that 5-vinylhydantoin would be obtained. Accordingly, it is apparently unexpected that, according to the present invention, the addition reaction of methyl mercaptan to AC and the hydantoin ring forming reaction using an ammonia or ammonium supplying agent and a carbonic acid or carbonate supplying agent effected in one-stage, accompanied by no side reactions such as decomposition and polymerization of AC.

AC to be employed as a starting material in the process of this invention may be used after purified by distillation or in the form of solution in a suitable solvent. AC is a compound which is extremely stable if maintained under the acidic condition and at low temperatures. Furthermore, since hydrocyanic acid, very poisonous chemicals, is used in the form combined with acrolein, handling and transportation thereof can be readily done, leading to relaxation of restriction on the location of methionine-producing factory. Thus, from the economical point of view also, the present process using as a starting material AC is very advantageous.

In carrying out the first step, i.e., the hydantoin ring forming reaction simultaneously with addition reaction in the process of this invention, the reaction may suitably be effected in the presence of an organic solvent or an aqueous organic solvent. As the organic solvents, there may be employed any of those organic solvents that could not decompose during the reaction and would be inert to the reaction. Examples of these organic solvents include such common solvents as alcohols, alcohol ethers, nitriles, nitroalkanes, amides, amines, ethers, hydrocarbons, halogenated hydrocarbons, ketones, aldehydes, organic carboxylic acids, esters and the like. In particular, lower aliphatic alcohols, lower aliphatic nitriles, nitroalkanes, alcohol ethers, dialkyl sulfoxides, dialkylformamides, dialkylacetamides, hexaalkyl phosphoramides, cyclic amines and the like are preferable since they can give the favourable results. Illustrative examples of these preferable solvents are methanol, ethanol, isopropanol, n-propanol, tert. butanol, n-butanol, ethylene glycol, acetonitrile, propionitrile, malononitrile, succinonitrile, ethylene glycol monomethyl ether, nitromethane, nitroethane, dimethylformamide, dimethylacetamide, N-methylpyrrolidone, dimethyl sulfoxide, hexamethyl phosphoramide, pyridine and the like. The organic solvent may be employed in the form of aqueous organic solvent. The water content of such aqueous organic solvent is preferably not greater than 50% by weight, as mentioned before.

The reaction of this step is effected at a temperature ranging from about 30°C. to about 200°C. and preferably at about 50° to 150°C. in view of rate of reaction, selectivity in the reaction and other factors.

The reaction period in this step is not critical, but the rection may be usually completed in about 0.5 to 3 hours.

The methyl mercaptan to be employed in the step of the process of the present invention may be of a gaseous or liquid state. The amount of methyl mercaptan to be employed is theoretically of an equivalent to AC but preferably of a somewhat excess.

With respect to the reagents for forming a hydantoin ring; namely an ammonia or ammonium supplying agent, and a carbonic acid or carbonate supplying agent, the former include gaseous ammonia, liquid ammonia, ammonium carbonate, ammonium bromide, ammonium sulfate, ammonium acetate, ammonium cyanide, ammonium carbamate, ammonium hydrogencarbonate and the like, and the latter include carbon dioxide gas, solid carbonic acid, ammonium carbonate, ammonium carbamate, ammonium hydrogencarbonate, sodium carbonate and the like. As apparent from the above, the ammonia or ammonium supplying agent may be the same with the carbonic acid or carbonate supplying agent. The amount to be employed is not critical, but there may be usually employed such an amount to be utilized in a conventional hydantoin-forming reaction, for example 1 to 4 molar equivalents, preferably 1.5 to 3 molar equivalents to AC.

The reaction may be conducted under atmospheric pressure while blowing gaseous methyl mercaptan into the reaction system, or under super atmospheric pressure while maintaining methyl mercaptan in the liquid state.

After completion of the reaction in the abovementioned first step, the reaction mixture is subjected to the subsequent or second step either as such or, if necessary, after distilling off the solvent to obtain a concentrate.

In carrying out the second step, i.e., the hydrolyzing reaction in the process of this invention, the reaction may suitably can be effected by subjecting the reaction mixture or the concentrate obtained in the first step to hydrolysis. The operation of hydrolysis may be conducted according to the method commonly employed in the hydrolysis of hydantoin. The method of hydrolysis involves, for example, heating in the presence of a suitable base or acid. Suitable examples of the bases include alkali metal hydroxides, e.g., sodium or potassium hydroxide; alkaline earth metal hydroxides, e.g., calcium or barium hydroxide; alkali metal carbonates, e.g., sodium or potassium carbonate; and the like. Suitable examples of the acids include inorganic acids, e.g., hydrochloric or sulfuric acid; and organic acids, e.g., acetic or propionic acid.

After completion of the second step in the process of this invention, the desired product DL-methionine, can be easily recovered, as pure crystals from the reaction mixture through isolation and purification by a conventional method for instance, by the treatment with a suitable ion exchange resin or by neutralization.

Some illustrative advantages, in respect to known methods, obtained by the present process for preparing DL-methionine are given as follows:
particularly high yield with respect to acrolein cyanhydrin; and high purity of final product, titer in DL-methionine of 99 to 99.5%.

This invention is more fully illustrated by the following examples, which are given solely for the purpose of illustrating of this invention and should not be construed to be limiting the scope of this invention.

EXAMPLE 1

Into an autoclave having a capacity of 2 liters were charged 83g. of acrolein cyanohydrin, 240g. of ammonium bicarbonate and 58g. of methyl mercaptan together with 1000ml. of methanol and the resulting mixture was heated with stirring at 80°C. for 1.5 hours. After completion of the reaction, the reaction mixture was concentrated under reduced pressure and then to the resulting brown paste were added 600ml. of 3N NaOH. The resulting mixture was heated at 160°C. for 1.5 hours. The reaction mixture was passed through Amberite-200 (trade name of ion exchange resin), which was then eluted with a 5% aqueous ammonia. The eluate so obtained was treated with active carbon and concentrated to give 120g. of DL-methionine as crystals.

EXAMPLE 2

A series of reactions using a variety of solvents, were carried out as follows.

Into a stainless steel pressure reactor having a capacity of 100ml. were charged 3.32g. of acrolein cyanohydrin and 9.5g. of ammonium bicarbonate together with 40ml. of the organic solvent indicated below. The reactor was cooled to −30°C. externally with dry ice-methanol. Separately, 2.0g. of cold liquid methyl mercaptan were withdrawn from a bomb and introduced into the reactor. The reactor was then sealed and shaken in an oil bath at 80°C. for 1.5 hours. Thereafter, the solvent was removed from the reaction mixture and 40ml. of 2N NaOH were added to the residue, which was then diluted with water to make up the whole amount to 50ml. The resulting mixture was heated at 160°C. for 1.5 hours. The reaction mixture was treated in the same manner as described in Example 1 to give DL-methionine at the yield indicated below.

| Organic solvent | Yield of DL-methionine (%) |
|---|---|
| Methanol | 87.9 |
| Ethanol | 84.0 |
| Isopropanol | 82.0 |
| tert. Butanol | 80.0 |
| Ethylene glycol | 83.5 |
| Acetonitrile | 85.2 |
| Nitromethane | 76.5 |
| Dimethylacetamide | 83.3 |
| Dimethylformamide | 83.0 |
| Tetrahydrofuran | 72.1 |
| Pyridine | 84.5 |
| Dimethylsulfoxide | 80.5 |
| Acetone | 74.2 |
| Chloroform | 72.2 |
| Benzene | 70.5 |
| Ethylene glycol menomethyl ether | 75.5 |

EXAMPLE 3

A series of the same procedures as described in Example 2, were repeated except that the aqueous organic solvent as stated below was employed instead of the organic solvent. The results are summarized hereinbelow.

| | Aqueous organic solvent | | |
|---|---|---|---|
| Organic solvent | Amount of organic solvent (ml.) | Amount of water (ml.) | Yield of DL-methionine (%) |
| Methanol | 40 | 3.5 | 85.0 |
| " | " | 9.0 | 83.3 |
| " | " | 15.0 | 81.5 |
| Ethanol | " | 3.5 | 81.5 |
| " | " | 9.0 | 79.5 |
| " | " | 15.0 | 81.2 |
| Acetonitrile | " | 3.5 | 85.2 |
| Isopropanol | " | " | 82.9 |
| Dimethylformamide | " | " | 81.0 |
| Tetrahydrofuran | " | " | 72.5 |
| Acetone | " | " | 74.0 |

EXAMPLE 4

Into a pressure reactor having a capacity of 100ml. were charged 3.32g. of acrolein cyanohydrin, 2.0g. of methyl mercaptan and the indicated amount of each of various hydantoin ring forming reagents as shown below together with 3 molar equivalents of methanol. Then, the reaction was carried out in the same manner as described in Example 2. The results are summarized hereinbelow.

| Hydantoin ring forming reagent | Yield of DL-methionine (%) |
|---|---|
| Ammonium carbonate | 85.9 |
| Ammonium bicarbonate | 87.8 |
| { Liquid ammonia<br>Solid carbon dioxide | 83.6 |
| Ammonium carbamate | 80.5 |

EXAMPLE 5

3.32G. of acrolein cyanhydrin and 9.5g. of ammonium bicarbonate were dissolved in 40ml. of methanol and then charged into a stainless steel pressure reactor having a capacity of 100ml. the reactor was cooled to −30°C. externally with dry ice-methanol. Separately, 2.0g. of cold liquid methyl mercaptan were withdrawn from a bomb and introduced into the reactor, which was then sealed. The hydantoin ring forming reactions were conducted at various temperatures as shown below. Thereafter, the solvent was removed from the reaction mixture and 40ml. of 2N NaOH were added to the residue, which was then diluted with water to make the whole amount to 50ml. The resulting mixture was heated to react at 160°C. for 1.5 hours. The reaction mixture was treated in the same manner as described in Example 1 to give DL-methionine at the yield indicated below.

| Hydantoin ring forming reaction temperature, °C. | 40 | 60 | 100 | 150 |
|---|---|---|---|---|
| Reaction time, hours | 3 | 2 | 1 | 0.5 |
| Yield of DL-methionine, % | 65 | 78 | 87 | 69 |

What is claimed is:

1. A process for the preparation of DL-methionine which comprises reacting acrolein cyanhydrin with an excess amount of methylmercaptan and 1–4 moles per mole of acrolein cyanohydrin of a member selected from the group consisting of, gaseous ammonia, liquid ammonia, ammonium bromide, ammonium sulfate, ammonium acetate and ammonium cyanide together with 1–4 moles per mole of acrolein cyanohydrin of a member selected from the group consisting of carbon dioxide gas, solid carbon dioxide and sodium carbonate in the presence of an organic solvent or an aqueous organic solvent of which the water content is not greater than 50% by weight at a temperature of 30° to 200°C to accomplish in addition reaction of the methyl mercaptan to the double bond of the acrolein cyanohydrin simultaneously with a hydantoin ring forming reaction followed by hydrolysis of the resultant product.

2. A process as claimed in claim 1, wherein said organic solvent is selected from the group consisting of lower aliphatic alcohols, lower aliphatic nitriles, nitroalkanes, alchol ethers, dialkyl sulfoxides, dialkylformamides, dialkylacetamides, hexaalkyl phosphoramides and cyclic amines.

3. A process as claimed in claim 2, wherein said organic solvent is selected from the group consisting of methanol, ethanol, isopropanol, n-propanol, tert. butanol, n-butanol, ethylene glycol, acetonitrile, propionitrile, malononitrile, succinonitrile, ethylene glycol monomethyl ether, nitromethane, nitroethane, dimethylformamide, dimethylacetamide, N-methylpyrrolidone, dimethyl sulfoxide, hexamethyl phosphoramide and pyridine.

4. A process for the preparation of DL-methionine which comprises reacting acrolein cyanohydrin with an excess amount of methylmercaptan and 1–4 moles per mole of acrolein cyanohydrin of a member selected from the group consisting of ammonium carbonate, ammonium hydrogen carbonate and ammonium carbamate in the presence of an organic solvent or an aqueous organic solvent of which the water content is not greater than 50% by weight at a temperature of 30° to 200°C to accomplish an addition reaction of the methylmercaptan to the double bond of the acrolein cyanohydrin simultaneously with a hydantoin ring-forming reaction followed by hydrolysis of the resultant product.

* * * * *